June 4, 1935.  T. C. HENNEBERGER  2,003,443
CONTACTOR INDICATOR
Filed June 9, 1931
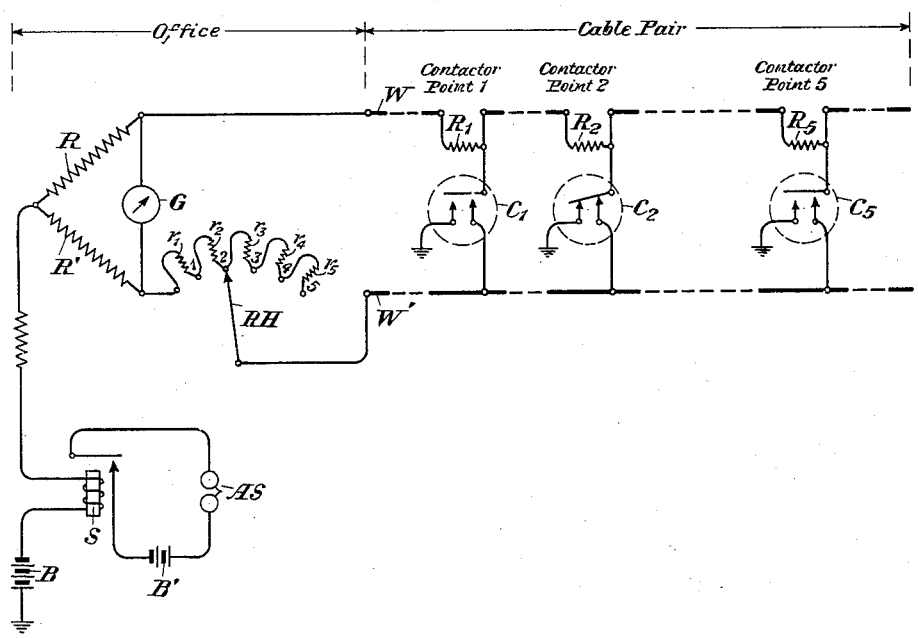
INVENTOR
*T.C. Henneberger*
BY
ATTORNEY Patented June 4, 1935

2,003,443

UNITED STATES PATENT OFFICE 2,003,443

CONTACTOR INDICATOR

Thomas C. Henneberger, Caldwell, N. J., assignor to American Telephone and Telegraph Company, a corporation of New York Application June 9, 1931, Serial No. 543,233

5 Claims. (Cl. 177—311)

This invention relates to methods and apparatus having to do with cables which are maintained under gas pressure for testing purposes, and more particularly to methods of and means for producing an indication at an office as to which one of a number of pressure contactors located along the cable is operated.

In connection with the testing of long cables, it is the practice to maintain the cable under gas pressure. If this pressure falls below the normal or a predetermined value, it is desirable that an indication be given at some office or other point along the line of the cable. Accordingly, it is good practice to install at intervals along the cable low pressure alarm contactors or equivalent devices which operate to short-circuit a pair of a spare quad and produce a visual or audible signal at a repeater station, for instance, when the pressure falls.

In general, the applicant's invention resides in methods of and means for comparing the resistance of one conductor of the testing pair (with or without an added local known resistance) and an unknown resistance connected in series with the other conductor of the pair, the unknown resistance depending for its value upon the location of the operated contactor; the comparison of the two resistances by indicating the value of the unknown resistance serves to indicate the location of the operated contactor.

The principal object of the invention is to produce, in a convenient and thoroughly satisfactory manner, an indication of contactor location which is free from the liability of error due to atmospheric change affecting the cable.

The invention will be clearly understood when the detailed description of one desirable embodiment thereof is read with reference to the accompanying drawing which shows the system in diagrammatic form.

With reference to the drawing, there are disclosed two conductors W and W', forming a cable pair available for pressure testing purposes. This pair is shown terminated at its left end by certain office apparatus. It will be understood that at convenient intervals along the conductors W and W' are contactor points 1, 2 ... 5. The low pressure contactors $C_1$, $C_2$ ... $C_5$ are representative of any suitable number of contactors spaced along the cable. As is clearly indicated in the drawing, the contactor $C_1$ is nearest the office while the contactor $C_5$ is most distant therefrom.

In accordance with the present invention, fixed resistances $R_1$, $R_2$ and $R_5$ are inserted in series with the conductor W at the contactor points 1, 2 and 5, respectively. At the office there is shown a Wheatstone bridge arrangement having its arms formed by the equal resistances R and R', the rheostat RH in series with the second conductor W' and the first conductor W in series with one or more of the fixed resistances $R_1$ to $R_5$. A galvanometer G is shown connected across the bridge. In series with the bridge battery B is the winding of a relay S, which controls an alarm circuit including a battery B' and a suitable alarm indicator such as the signal bell AS specifically disclosed. It will be noted that when any one of the pressure contactors operates, the cable pair is connected at the corresponding point to a return conductor, such as the indicated ground.

The operation of the circuit is as follows: When contactor $C_2$, for instance, operates as a result of low cable pressure at the contactor point 2, ground is placed on the pair W, W' and a circuit is completed through relay S. The operation of this relay completes the circuit through the bell AS and the battery B', and the attendant at the office is notified that one of the contactors has operated.

The operation of contactor $C_2$ also causes the deflection of the galvanometer G at the office. The degree of deflection of the galvanometer will indicate the value of the resistance in series with the conductor W, which is an indication of the location of the operated contactor. It will be understood that the galvanometer G may be so calibrated as to give the indication of contactor location directly.

It is preferable to use a local known resistance in series with the conductor W'. For instance, it is desirable to use at the office an element such as the rheostat RH, calibrated in terms of contactor points to give a ready indication of the location of the contactor when the rheostat is adjusted to balance the bridge. The rheostat RH comprises the movable arm and the resistances $r_1$, $r_2$, $r_3$, $r_4$ and $r_5$, the number of these resistances corresponding to the number of contactor points and the value of the resistances corresponding to the values at the corresponding contactor points. For instances $r_1 = R_1$, $r_2 = R_2$, etc. While it is not essential to the invention, it is desirable that the line resistances $R_1$ to $R_5$ be equal resistances. Since the conductors W and W' are equally and similarly affected by any atmospheric changes to which the cable is subjected, it will be understood that when the rheostat RH is operated to produce a balance of the bridge as indicated by the galvanometer G, the position of the rheostat arm which produces this balance will be marked to correspond to the operated contactor point—for instance, "2". In other words, the degree of adjustment in the rheostat element necessary to balance the bridge serves as a ready indication of the location of the operated contactor—$C_2$, for instance.

It will be understood that the return path for the alarm circuit, which is indicated in the drawing as ground, might be replaced by a metallic return path such as one wire of a talking pair in the cable.

It will be readily understood that the above disclosed arrangement for indicating the location of an operated contactor is not only one which is satisfactorily convenient in apparatus and operation at the office, but also one which is quite free from error-producing effects of atmospheric change, since the two arms of the bridge the resistances of which are compared to determine the contactor location include equal lengths of the conductors W and W'.

While the invention has been disclosed specifically for the purpose of illustration, it is to be understood that it is capable of embodiment in other and different forms within the scope of the appended claims.

What is claimed is:

1. In association with a pair of conductors extending over substantially the same path and having an office at one end thereof and a plurality of short-circuiting devices located therealong and designed to operate thereon, a plurality of fixed resistances each associated locally with one of said short-circuiting devices, circuit connections whereby any one of said fixed resistances is connected effectively in series with the first conductor of said pair when its associated device or any device more distant from said office is operated, a resistance at said office, circuit connections whereby said office resistance is connected effectively in series with the second conductor of said pair upon the operation of any one of said short-circuiting devices, and means at said office responsive to the operation of any one of said short-circuiting devices for indicating the difference between the resistance of the two conductors and the respective elements effectively in series therewith, the effective lengths of the two conductors being equal.

2. In association with a pair of conductors extending over substantially the same path and having an office at one end thereof and a plurality of short-circuiting devices located therealong and designed to operate thereon, a plurality of fixed resistances each associated locally with one of said short-circuiting devices, circuit connections whereby any one of said fixed resistances is connected effectively in series with the first conductor of said pair when its associated device or any device more distant from said office is operated, a variable resistance at said office, circuit connections whereby said variable resistance is connected effectively in series with the second conductor of said pair upon the operation of any one of said short-circuiting devices, means at said office responsive to the operation of any one of said short-circuiting devices for indicating the difference between the resistances of the two conductors and the respective elements effectively in series therewith, means for adjusting said variable resistance to produce equality between the resistances of the two conductors and the respective elements effectively in series therewith, and means for indicating the degree of such adjustment required to produce said equality, the effective lengths of the two conductors being equal.

3. In association with a pair of conductors extending over substantially the same path and having a plurality of short-circuiting devices spaced therealong and designed to operate thereon, a plurality of line resistances each associated with one of said short-circuiting devices in series with the first conductor of said pair, a bridge arrangement at a station on the line of said pair having two fixed resistance arms and a variable resistance, said variable resistance being connected in series with the second conductor of said pair to form the third arm of the bridge, circuit arrangements for connecting in the bridge as the fourth arm thereof said first conductor and one or more of said line resistances upon the operation of any one of said short-circuiting devices, and means for adjusting said third arm to balance the bridge, whereby the degree of adjustment required for balance will indicate which one of said short-circuiting devices has operated, the effective lengths of the two conductors being equal.

4. In association with a pair of conductors extending over substantially the same path and having a plurality of short-circuiting devices spaced therealong and designed to operate thereon, a plurality of line resistances each associated with one of said short-circuiting devices in series with the first conductor of said pair, a Wheatstone bridge at a station on the line of said pair comprising two fixed resistances as adjacent arms and a rheostat in series with the second conductor of said pair to form the third arm, said first conductor and one or more of said line resistances forming the fourth arm, a galvanometer connected across said bridge, and an alarm circuit adapted to be completed upon the operation of any one of said short-circuiting devices, the effective lengths of the two conductors being equal.

5. In association with a pair of conductors extending over substantially the same path and having an office at one end thereof, a plurality of short-circuiting devices located along said conductors and designed to operate thereon and means for producing at the office an indication of which one of said short-circuiting devices has operated, said indication producing means including a plurality of fixed resistances each associated locally with one of said short-circuiting devices and adapted to be connected effectively in series with the first conductor of said pair when its associated device or any device more distant from said office is operated, means responsive to the operation of any one of said short-circuiting devices for connecting a variable resistance effectively in series with the second conductor of said pair, and means for comparing the resistances of the two conductors and the respective elements in series therewith, the effective lengths of the two conductors being equal.

THOMAS C. HENNEBERGER.